(12) United States Patent
Turta et al.

(10) Patent No.: US 7,938,182 B2
(45) Date of Patent: May 10, 2011

(54) METHOD FOR RECOVERY OF NATURAL GAS FROM A GROUP OF SUBTERRANEAN ZONES

(75) Inventors: Alex Turta, Calgary (CA); Steve Sim, Calgary (CA); Ashok Singhal, Calgary (CA); Gary Bunio, Calgary (CA); Blaine F. Hawkins, Calgary (CA)

(73) Assignee: Alberta Research Council Inc., Edmonton (CA)

( * ) Notice: Subject to any disclaimer, the term of this patent is extended or adjusted under 35 U.S.C. 154(b) by 250 days.

(21) Appl. No.: 12/356,808

(22) Filed: Jan. 21, 2009

(65) Prior Publication Data

US 2009/0200026 A1 Aug. 13, 2009

(30) Foreign Application Priority Data

Feb. 7, 2008 (CA) .................................. 2619557

(51) Int. Cl.
*E21B 43/16* (2006.01)
*E21B 43/40* (2006.01)
(52) U.S. Cl. ..................... 166/268; 166/266; 405/129.35
(58) Field of Classification Search .................. 166/266, 166/268
See application file for complete search history.

(56) References Cited

U.S. PATENT DOCUMENTS 2,856,000 A * 10/1958 Barron ........................... 166/268
3,131,760 A * 5/1964 Glanville et al. .............. 166/268
3,149,668 A 9/1964 Arendt
3,215,198 A 11/1965 Willman
(Continued)

FOREIGN PATENT DOCUMENTS

CA 2492082 1/2004
(Continued)

OTHER PUBLICATIONS

Fisher, L. et. al., Costs for Capture and Sequestration of CO2 in Western Canadian Geologic Media, presented at 53rd Annual Technical Meeting of the Petroleum Society, Jun. 11-13, 2002, Calgary, Canada (Abstract only).

(Continued)

*Primary Examiner* — George Suchfield
(74) *Attorney, Agent, or Firm* — Terrence N. Kuharchuk; Rodman & Rodman

(57) ABSTRACT

A method for recovering natural gas from a group of subterranean zones containing natural gas, including injecting an amount of a displacing gas into a first subterranean zone, producing a first produced gas from the first subterranean zone, collecting an amount of the first produced gas wherein the quality of the collected first produced gas is higher than or equal to a threshold production quality for the first produced gas, injecting an amount of the first produced gas into a second subterranean zone wherein the quality of the injected first produced gas is higher than or equal to a threshold injection quality for the first produced gas, producing a second produced gas from the second subterranean zone, and collecting an amount of the second produced gas wherein the quality of the collected second produced gas is higher than or equal to a threshold production quality for the second produced gas.

68 Claims, 3 Drawing Sheets

U.S. PATENT DOCUMENTS

| | | | | |
|---|---|---|---|---|
| 3,519,076 A | * | 7/1970 | Walker | 166/268 |
| 4,187,910 A | * | 2/1980 | Cornelius et al. | 166/305.1 |
| 4,319,635 A | * | 3/1982 | Jones | 166/401 |
| 4,320,802 A | * | 3/1982 | Garbo | 166/267 |
| 4,393,936 A | | 7/1983 | Josendal | |
| 4,548,267 A | | 10/1985 | Sheffield et al. | |
| 4,552,216 A | * | 11/1985 | Wilson | 166/261 |
| 4,628,999 A | * | 12/1986 | Kiss et al. | 166/402 |
| 4,635,721 A | | 1/1987 | Sheffield et al. | |
| 4,669,542 A | * | 6/1987 | Venkatesan | 356/243.2 |
| 4,765,407 A | | 8/1988 | Yuvancic | |
| 5,085,274 A | * | 2/1992 | Puri et al. | 166/252.1 |
| 5,439,054 A | * | 8/1995 | Chaback et al. | 166/252.1 |
| 5,769,165 A | | 6/1998 | Bross et al. | |
| 6,450,256 B2 | * | 9/2002 | Mones | 166/250.01 |
| 6,543,535 B2 | | 4/2003 | Converse et al. | |
| 7,128,150 B2 | | 10/2006 | Thomas et al. | |
| 7,172,030 B2 | | 2/2007 | Horner et al. | |
| 2006/0054318 A1 | * | 3/2006 | Sarada | 166/266 |

FOREIGN PATENT DOCUMENTS

| | | |
|---|---|---|
| CA | 2483896 | 4/2005 |
| CA | 2505449 | 2/2006 |

OTHER PUBLICATIONS

Mamora, D.D., et. al., "Enhanced Gas Recovery by Carbon Dioxide Sequestration in Depleted Gas Reservoirs," SPE 77347 presented at SPE Annual Technical Conference and Exhibition, Sep. 29-Oct. 2, 2002, Houston, USA, 9 pp.

Papay, J., "Improved Recovery of Conventional Natural Gas," published in the German magazine Erdoel, Erdgas, Kohle, Part I: Theoretical Discussion of Recovery Methods, No. 6, pp. 302-308, Jan. 1999 and Part II: Results of a Pilot Test; Nos. 7-8, pp. 354-355, Jul.-Aug. 1999, 9 pp.

Clemens, T., et al., "CO2 Enhanced Gas Recovery Studied for an Example Gas Reservoir," SPE 77348 Annual Technical Conference and Exhibition, San Antonio, Texas, Sep. 29-Oct. 2, 2002, 8 pp.

Oldenburg, C.M., "Carbon Dioxide as Cushion Gas for Natural Gas Storage," Energy and Fuels, 2003, 17, 240-246.

Oldenburg, C.M., et al., "Mixing of CO2 and CH4 in Gas Reservoirs: Code Comparison Studies," Energy and Fuels, 15, 293-298, 2002, 6 pp.

"Natural Gas Processing: The Crucial Link Between Natural Gas Production and Its Transportation to Market," Energy Information Administration, Office of Oil and Gas, Jan. 2006, pp. 1-11.

* cited by examiner

METHOD FOR RECOVERY OF NATURAL GAS FROM A GROUP OF SUBTERRANEAN ZONES

TECHNICAL FIELD

A method for recovering natural gas from a group of subterranean zones containing natural gas.

BACKGROUND OF THE INVENTION

A first category of natural gas reservoir is known as a depletion gas reservoir. A second category of natural gas reservoir is known as a water drive reservoir.

In a depletion gas reservoir, the pore volume which contains natural gas remains constant over the duration of exploitation, so that the reservoir is "closed". Recovery of natural gas from the reservoir is therefore accompanied by a decrease in the static reservoir pressure, and the extent of the ultimate recovery of natural gas from the reservoir depends upon the abandonment pressure. In a depletion gas reservoir, the ultimate recovery of natural gas may be as high as 70%-85% of the original gas in place ("OGIP"), and the extent of water production from the reservoir is typically very little or is absent altogether.

In a water drive reservoir, the pore volume which contains natural gas decreases over the duration of exploitation as natural gas is displaced by water. As a result, the reservoir pressure at abandonment of a water drive reservoir may remain relatively high. The water drive may be a lateral water drive or a bottom water drive. In the former case the water displaces the natural gas laterally or horizontally. In the latter case the water displaces the natural gas vertically upward. In both cases the water ultimately encroaches into production wells, usually in the lower parts of the pay interval. Also in both cases, the volumetric sweep efficiency is relatively low and the ultimate gas recovery is typically also relatively low (as low as 50%-65% of OGIP), due to the relatively low sweep efficiency and due to trapping of natural gas in the water invaded zone.

Enhanced recovery of natural gas from a depletion gas reservoir may be achieved by introducing a displacing agent into the reservoir. The displacing agent takes up a portion of the pore volume of the reservoir, which causes the natural gas to migrate within the reservoir and to occupy a smaller portion of the pore volume of the reservoir. The displacing agent can thus be used to drive the natural gas toward a production location and to pressurize the reservoir to a pressure above the abandonment pressure.

Carbon dioxide is derived both from natural sources and from man-made sources such as the burning of hydrocarbons and the carrying out of industrial processes. Carbon dioxide is the most abundant of the so-called "greenhouse gases". It is generally believed that greenhouse gases may contribute to climate change and global warming. It has therefore become a significant environmental goal to limit the extent of carbon dioxide emissions into the atmosphere.

One strategy for limiting carbon dioxide emissions is to store or sequester carbon dioxide underground as an alternative to releasing it into the atmosphere. Carbon dioxide may be stored or sequestered in depleted oil and/or gas reservoirs, and may provide an added benefit of increasing the static reservoir pressure of the depleted reservoirs.

U.S. Pat. No. 7,172,030 (Horner et al) describes processes involving the injection into a subterranean reservoir of a waste gas stream containing nitrogen and carbon dioxide and in some cases oxygen as primary components. The injection of the waste gas stream into the reservoir may be performed for a variety of objectives. A first objective is the separation of carbon dioxide from the waste gas and retention of the separated carbon dioxide in a water presence in the reservoir. A second objective is increasing and/or maintaining the reservoir pressure to facilitate production of natural gas from the reservoir. A third objective is providing enhanced production of natural gas from the reservoir by displacement of natural gas towards one or more production wells. A fourth objective is causing some of the carbon dioxide to come into contact with and be dissolved in bitumen contained in the reservoir, thereby reducing the viscosity and improving the flow capability of the bitumen.

The processes described in U.S. Pat. No. 7,172,030 (Horner et al) are based upon the physical properties of the constituents of the waste gas stream relative to each other and relative to the physical properties of methane as a principal component of natural gas. As one example, the constituents of the waste gas stream are noted generally to have a relatively higher specific gravity and viscosity than does methane, which results in the constituents of the waste gas stream being advantageous agents for displacing or sweeping natural gas toward production wells. As a second example, the very high water solubility of carbon dioxide relative to the other constituents of the waste gas stream results in preferential dissolution of carbon dioxide in water which is present in the reservoir.

SUMMARY OF THE INVENTION

The present invention is a method for recovering natural gas from a group of subterranean zones containing natural gas, in which a displacing gas is injected into a first subterranean zone to initiate the method and in which produced gases are injected into one or more subterranean zones in order to recover natural gas from such zones.

Due to the injection of gases into subterranean zones to recover natural gas therefrom, the method of the invention may be characterized as an "enhanced gas recovery method" or an "EGR method". In some aspects, due to the injection of produced gases produced from certain subterranean zones into one or more other subterranean zones, the method of the invention may be characterized as a "cascading enhanced gas recovery method" or a "cascading EGR method", in which similar operations conducted in different subterranean zones are linked in a cascading or chain-like manner.

In a first aspect, a displacing gas may be injected into a subterranean zone $Z_N$ to initiate the method, a produced gas $G_N$ produced from the subterranean zone $Z_N$ may be injected into a subterranean zone $Z_{N+1}$, a produced gas $G_{N+1}$ produced from the subterranean zone $Z_{N+1}$ may be injected into a subterranean zone $Z_{N+2}$, and so on. Alternatively, a displacing gas may be injected into a subterranean zone $Z_N$ to initiate the method, a produced gas $G_N$ produced from the subterranean zone $Z_N$ may be injected into one or more subterranean zones, a produced gas $G_{N+1}$ produced from a subterranean zone $Z_{N+1}$ may be injected into one or more subterranean zones, a produced gas $G_{N+2}$ produced from the subterranean zone $Z_{N+2}$ may be injected into one or more subterranean zones, and so on. In other words, a displacing gas is injected into a first subterranean zone and one or more produced gases are injected into one or more subterranean zones.

In a second aspect, a displacing gas is injected into a first subterranean zone and a first produced gas is produced from the first subterranean zone. The first produced gas may be collected and/or may be injected into a second subterranean zone. A second produced gas may be produced from the second subterranean zone. The second produced gas may be collected and/or may be injected into a third subterranean zone, and so on.

The produced gases may be collected and/or injected into subterranean zones based upon any criterion or criteria. Preferably the produced gases are collected and/or injected into subterranean zones based upon the quality of the produced gases.

In a third aspect, the invention is a method for recovering natural gas from a group of subterranean zones containing natural gas, the method comprising:

(a) injecting an amount of a displacing gas into a first subterranean zone at a first injection location associated with the first subterranean zone;

(b) producing a first produced gas from the first subterranean zone at a first production location associated with the first subterranean zone, wherein the first production location is spaced from the first injection location, wherein the first produced gas has a first produced gas quality, and wherein the first produced gas quality changes over time following breakthrough of the first displacing gas at the first production location;

(c) collecting an amount of the first produced gas, wherein the first produced gas quality of the collected first produced gas is higher than or equal to a threshold production quality for the first produced gas;

(d) injecting an amount of the first produced gas into a second subterranean zone at a second injection location associated with the second subterranean zone, wherein the first produced gas quality of the injected first produced gas is higher than or equal to a threshold injection quality for the first produced gas;

(e) producing a second produced gas from the second subterranean zone at a second production location associated with the second subterranean zone, wherein the second production location is spaced from the second injection location, wherein the second produced gas has a second produced gas quality, and wherein the second produced gas quality changes over time following breakthrough of the second displacing gas at the second production location; and (f) collecting an amount of the second produced gas, wherein the second produced gas quality of the collected second produced gas is higher than or equal to a threshold production quality for the second produced gas.

The displacing gas may be comprised of any gas or combination of gases which is suitable for use as a displacing agent for natural gas. The displacing gas may contain impurities such as solid and/or liquid particles and may in some circumstances be comprised of one or more supercritical fluids. The displacing gas may be naturally occurring or may be an engineered or manufactured displacing agent.

In some embodiments the displacing gas is comprised of carbon dioxide so that an amount of carbon dioxide may be sequestered in the first subterranean zone. In such embodiments the displacing gas may consist essentially of carbon dioxide, or the displacing gas may be comprised of carbon dioxide and one or more other gases.

For example, the displacing gas may be comprised of carbon dioxide and a secondary displacing gas. The secondary displacing gas may be comprised of any gas or combination of gases which is suitable for use as a displacing agent for natural gas.

As a first non-limiting example, the secondary displacing gas may be a hydrocarbon gas including but not limited to methane, ethane, propane and butane, so that the displacing gas is comprised of carbon dioxide and hydrocarbon gas. As a second non-limiting example, the secondary displacing gas may be nitrogen so that the displacing gas is comprised of carbon dioxide and nitrogen. As a third non-limiting example, the secondary displacing gas may be sulphur dioxide so that the displacing gas is comprised of carbon dioxide and sulphur dioxide. As a fourth non-limiting example, the secondary displacing gas may be a mixture of nitrogen and hydrocarbon gas so that the displacing gas is comprised of carbon dioxide, nitrogen and hydrocarbon gas. As a fifth non-limiting example, the secondary displacing gas may be a mixture of nitrogen and sulphur dioxide so that the displacing gas is comprised of carbon dioxide, nitrogen and sulphur dioxide.

Preferably the secondary displacing gas has a relatively lower solubility in water than does carbon dioxide so that carbon dioxide may be preferentially dissolved in water which is present in the first subterranean zone, thereby resulting in carbon dioxide sequestration in the first subterranean zone as the secondary displacing gas displaces the natural gas in the first subterranean zone.

Preferably the secondary displacing gas is tolerated in at least some amount as a constituent of marketable natural gas, particularly if the secondary displacing gas has a lower solubility in water than does carbon dioxide.

Where the displacing gas is comprised of carbon dioxide and a secondary displacing gas, the displacing gas may be further comprised of one or more other gases either as constituents or impurities.

Other substances included in the displacing gas preferably either have a relatively higher solubility in water than does carbon dioxide or are tolerated as a constituent of marketable natural gas. For example, the displacing gas may contain hydrogen sulphide as an "other substance", which has a significantly higher solubility in water than does carbon dioxide and which therefore will be more preferentially dissolved in water present in the first subterranean zone than will carbon dioxide.

As one example of a displacing gas containing other substances, in some embodiments the displacing gas may be an acid gas, which acid gas may contain carbon dioxide, nitrogen, sulphur dioxide and hydrogen sulphide along with other substances.

As a second example of a displacing gas containing other substances, in some embodiments the displacing gas may be a mixture of carbon dioxide and natural gas, wherein natural gas contains hydrocarbon gases such as methane and other substances.

In other embodiments the displacing gas may be flue gas or may be comprised of flue gas.

As used herein, "flue gas" is an untreated or treated exhaust gas resulting from the combustion of a fuel. Although the composition of flue gas depends upon the fuel which is burned, untreated flue gas typically comprises about 10%-15% carbon dioxide and about 0%-4% oxygen, with the remaining portion comprising mostly nitrogen (i.e., greater than about 65%) with traces of other substances such as non-oxidized hydrocarbons, water, sulphur dioxide, nitrous oxide, nitrogen dioxide etc. Treated flue gas is flue gas which has been treated to remove certain substances therefrom or to reduce the amount of one or more substances contained therein.

In some embodiments where the displacing gas is flue gas, the flue gas is a treated flue gas which has been treated to reduce the amount of water and/or oxygen which is contained therein.

As used herein, a "subterranean zone" is either a discrete reservoir or is a region of a discrete reservoir. Discrete reservoirs may be offset from each other geographically or may be comprised of different geologic formations overlying each other in a stacked configuration. As a result, the invention may be used to recover natural gas from a group of discrete reservoirs, from a group of regions of a single discrete reservoir, or from a group comprising discrete reservoirs and regions of discrete reservoirs. A subterranean zone may also be comprised of a number of "subzones" so that the method of the invention may effectively be performed in "parallel" in a number of subzones which together comprise a single subterranean zone.

The invention is intended for use in recovering natural gas from subterranean zones from which an amount of the original gas in place ("OGIP") has previously been removed.

Where the invention is used to recover natural gas from a subterranean zone which is in pressure communication with heavy oil or bitumen containing formations which may be exploited using thermal recovery methods such as steam drive, in-situ combustion or steam assisted gravity drainage (SAGD), preferably at least about 30% of the OGIP has previously been removed from the subterranean zone. In other applications, the invention is preferably used to recover natural gas from subterranean zones from which at least about 60% of the OGIP has previously been removed.

The invention may be used to recover natural gas from a group of subterranean zones consisting of any number of subterranean zones. In the most simple application of the invention, the group of subterranean zones consists of a first subterranean zone and a second subterranean zone. However, the group of subterranean zones may be further comprised of a third subterranean zone, a fourth subterranean zone, etc.

For example, in the second aspect, the method may be further comprised of:

(g) injecting an amount of the second produced gas into a third subterranean zone at a third injection location associated with the third subterranean zone, wherein the second produced gas quality of the injected second produced gas is higher than or equal to a threshold injection quality for the second produced gas;

(h) producing a third produced gas from the third subterranean zone at a third production location associated with the third subterranean zone, wherein the third production location is spaced from the third injection location, wherein the third produced gas has a third produced gas quality, and wherein the third produced gas quality changes over time following breakthrough of the third displacing gas at the second production location; and (i) collecting an amount of the third produced gas, wherein the third produced gas quality of the collected third produced gas is higher than or equal to a threshold production quality for the third produced gas.

A produced gas produced from a subterranean zone has a produced gas quality. The produced gas quality tends to change over time due to the introduction of the displacing agent which is injected into the subterranean zone.

The produced gas quality may be an instantaneous quality of the produced gas which is produced at a particular instant in time or the produced gas quality may be an average quality of the produced gas which is produced over a particular interval of time. The interval of time may be any suitable interval having regard to the quantity of the produced gas. For example, the interval of time may in some applications be about one day.

A produced gas produced from a subterranean zone may be collected for use as marketable natural gas product, and/or may be injected into a subterranean zone, and/or may be otherwise disposed of. In some embodiments a produced gas or a portion thereof may be combined with one or more other produced gases to provide a combined produced gas.

Although the determination of whether to collect the produced gas, inject the produced gas or dispose of the produced gas may be based upon any criterion or criteria, the determination is preferably made based at least in part upon the produced gas quality.

The determination of the produced gas quality and the determination of whether to collect the produced gas, inject the produced gas or dispose of the produced gas may be made based upon the state of the produced gas immediately upon its production, or may be based upon the state of the produced gas following some treatment of the produced gas. In some embodiments a produced gas may be treated following its production from a subterranean zone to remove water and/or other substances therefrom.

In most embodiments, the threshold production quality of the produced gases is a "higher" quality than the threshold injection quality of the produced gases. In other words, in most embodiments, produced gas which is not of a suitably high quality for collection may be of a suitably high quality for injection.

The determinations of whether to collect, inject or dispose of the produced gases may be managed in any suitable manner.

As a first example, the produced gases produced from the subterranean zones may be kept separate from each other, in which case the produced gas quality is determined individually for each produced gas produced from each subterranean zone. The threshold production quality may be the same for each subterranean zone or the threshold production quality may vary amongst subterranean zones. Similarly, the threshold injection quality may be the same for each subterranean zone or the threshold injection quality may vary amongst subterranean zones.

In embodiments in which the produced gases are kept separate and in which the threshold production quality is a higher quality than the threshold injection quality, the produced gases may be collected if the produced gas quality is higher than or equal to the threshold production quality, and the produced gases may be injected if the produced gas quality is lower than the threshold production quality but higher than or equal to the threshold injection quality.

If the produced gas quality is lower than the threshold injection quality, the produced gases may be disposed of in some other manner or production of the produced gases may be terminated, such as by shutting in production wells associated with the subterranean zone. Furthermore, one or more other displacing agents may be injected into the subterranean zones if additional amounts of displacing agent are needed to achieve the objectives of the method in the subterranean zones. As a first non-limiting example, an amount of flue gas may be injected into one or more subterranean zones when the produced gas quality is lower than the threshold injection quality. As a second non-limiting example, an amount of air (limited due to the potential hazard because of the oxygen contained therein) may be injected into one or more subterranean zones when the produced gas quality is lower than the threshold injection quality. For safety considerations, this injection of air may be followed by injection of an amount of an inert gas (typically a small slug) into the subterranean zone or zones in order to complete or "wrap up" the method of the invention.

As a second example, some or all of the produced gases produced from two or more subterranean zones may be combined to provide a combined produced gas having a combined produced gas quality.

In embodiments in which the produced gases are combined and in which the threshold production quality of the combined produced gas is a higher quality than the threshold injection quality of the combined produced gas, the combined produced gas may be collected if the combined produced gas quality of the combined produced gas is higher than or equal to threshold production quality, and the combined produced gas may be injected if the combined produced gas quality of the combined produced gas is lower than the threshold production quality but higher than or equal to the threshold injection quality.

If the combined produced gas quality is lower than the threshold injection quality, the combined produced gas may be disposed of in some other manner or production of one or more of the produced gases may be terminated. Furthermore, one or more other displacing agents may be injected into the subterranean zones if additional displacing agent is needed to achieve the objectives of the method in the subterranean zones. As a first non-limiting example, an amount of flue gas maybe be injected into one or more subterranean zones when the combined produced gas quality is lower than the threshold injection quality. As a second non-limiting example, an amount of air (limited due to the potential hazard because of the oxygen contained therein) may be injected into one or more subterranean zones when the combined produced gas quality is lower than the threshold injection quality. For safety considerations, this injection of air may be followed by injection of an amount of an inert gas (typically a small slug) into the subterranean zone or zones in order to complete or "wrap up" the method of the invention.

As a third example, different streams may be provided for the produced gases and the produced gases may be directed to one or more of the different streams. In some embodiments, the produced gases may be directed into a collection stream, an injection stream, a combination stream and/or a disposal stream. All of a particular produced gas may be directed to a single stream, or portions of the produced gas may be directed to different streams. The determinations of which streams to direct the produced gases into may be made having regard to maximizing the amounts of collected produced gas, maximizing the amounts of injected produced gas, or having regard to some other criterion or criteria.

The threshold production quality may be defined with reference to properties which render the produced gas suitable for collection as a marketable natural gas product. Such properties may relate to the composition of the produced gas, and may relate to minimum and/or maximum amounts of substances which may be present in the produced gas in order for the produced gas to be acceptable as a marketable product.

As used herein, a marketable natural gas product is a fluid meeting quality specifications which make the fluid acceptable for transportation by pipeline either directly to market or to a facility which will accept the fluid for further processing to prepare the fluid for market, and which may also be described as a pipeline quality natural gas product.

The threshold production quality may also be defined with reference to properties which facilitate optimization of the method having regard to the relative sizes of the subterranean zones, the relative pressures of the subterranean zones, and the resulting requirements of the subterranean zones with respect to the amounts of produced gas which should be made available for injection into the subterranean zones. Depending upon the injection requirements of the subterranean zones, the threshold production quality may be a higher quality or a lower quality than that suggested by the quality requirements for a marketable natural gas product, in order to provide a suitable amount of produced gas for injection into the subterranean zones.

The threshold production quality for each subterranean zone is preferably defined having regard to the composition of the gas which is injected into the subterranean zone, since some or all of the substances which are included in the injected gas over time will eventually be included in the produced gas. The threshold production quality is also preferably defined having regard to the composition of the natural gas which is contained in the subterranean zones.

As a first example, if the displacing gas consists of carbon dioxide, the threshold production quality of each produced gas and/or combined produced gas may be defined by a maximum allowable production amount of carbon dioxide which may be included in the produced gas.

As a second example, if the displacing gas is comprised of carbon dioxide and a secondary displacing gas which has a lower solubility in water than does carbon dioxide and which is not considered to be an impurity in natural gas (such as, for example methane and/or some other hydrocarbon gas), the threshold production quality of each produced gas and/or combined produced gas may be defined by a maximum allowable production amount of carbon dioxide which may be included in the produced gas.

As a third example, if the displacing gas is comprised of carbon dioxide and a secondary displacing gas which has a higher solubility in water than does carbon dioxide (such as, for example, hydrogen sulphide), the threshold production quality of each produced gas and/or combined produced gas may be defined by a maximum allowable production amount of carbon dioxide which may be included in the produced gas.

As a fourth example, if the displacing gas is comprised of carbon dioxide and a secondary displacing gas which has a lower solubility in water than does carbon dioxide and which is considered to be an impurity in natural gas (such as, for example nitrogen), the threshold production quality of each produced gas and/or combined produced gas may be defined by both a maximum allowable production amount of the secondary displacing gas which may be included in the produced gas and a maximum allowable production amount of carbon dioxide which may be included in the produced gas.

As a fifth example, if the displacing gas is comprised of nitrogen and some other substance which is not considered to be an impurity in natural gas (such as, for example methane and/or some other hydrocarbon gas), the threshold production quality of each produced gas and/or combined produced gas may be defined by a maximum allowable production amount of nitrogen which may be included in the produced gas.

In some embodiments, the maximum allowable production amount of carbon dioxide which may be included in the produced gas may be about 2 percent carbon dioxide by volume of the produced gas. The maximum allowable production amount of the secondary displacing gas which may be included in the produced gas will vary depending upon the secondary displacing gas. In some embodiments, if the secondary displacing gas is nitrogen, the maximum allowable production amount of nitrogen which may be included in the produced gas may be about 20 percent nitrogen by volume of the produced gas.

Preferably the threshold injection quality is defined with reference to properties which render the produced gas suitable for injection into a subterranean zone as a displacing agent for natural gas. Such properties may relate to the composition of the produced gas, may relate to the effectiveness of the produced gas as a displacing gas, and/or may relate to minimum and/or maximum amounts of substances which may be present in the produced gas.

The threshold injection quality for each subterranean zone may be defined having regard to the desired composition of the produced gas to be produced from the subterranean zone, since some or all of the substances which are included in the injected gas over time will eventually be included in the produced gas. The threshold injection quality for each subterranean zone may also be defined having regard to potential negative effects that substances contained in the injected gas may have on the efficiency of recovery of natural gas from the subterranean zone and upon equipment which is associated with the subterranean zone.

In this regard, the presence in a produced gas which is to be injected into a subterranean zone of substances which may be harmful to or which may damage equipment which is associated with the subterranean zone is preferably limited or prevented. For example, carbon dioxide is relatively corrosive in an aqueous environment and the presence of carbon dioxide in a displacing agent may cause damage to injection wells and other equipment associated with a subterranean zone.

As a result, in some embodiments the presence of carbon dioxide in a produced gas which is to be injected into a subterranean zone may be controlled. In some embodiments, particularly where the displacing gas is comprised of carbon dioxide, a produced gas quality is lower than the threshold injection quality of the produced gas when the produced gas includes more than a maximum allowable injection amount of carbon dioxide. The maximum allowable injection amount of carbon dioxide may be any selected amount, having regard both to the benefits of using carbon dioxide as a displacing agent and to the potential damage to injection wells and other equipment associated with the subterranean zone.

In embodiments where the presence of carbon dioxide in a produced gas which is to be injected into a subterranean zone is controlled, the maximum allowable injection amount of carbon dioxide which may be included in a produced gas is preferably not significantly higher than the amount of carbon dioxide which is included in the natural gas which is contained within the subterranean zone. In other words, preferably relatively little carbon dioxide is added to the natural gas as a result of its production as a produced gas.

In some embodiments, the maximum amount of carbon dioxide which may be added to the natural gas as a result of its production as a produced gas may be about 2 percent carbon dioxide by volume of the produced gas. In other words, if the natural gas contained in a subterranean zone contains X percent carbon dioxide, the maximum allowable injection amount of carbon dioxide which may be included in a produced gas from that subterranean zone may be about (X+2) percent.

In some embodiments, the potential negative effects of the presence of carbon dioxide or other substances in a produced gas may be ignored in defining the threshold injection quality.

In some embodiments, the threshold production quality of the produced gases may be lower than the threshold injection quality of the produced gases. In such embodiments, the practice of the method may be slightly modified. For example, an amount of the produced gas may be injected into one or more subterranean zones when the produced gas quality is higher than or equal to both the threshold injection quality and the threshold production quality. When the produced gas quality is lower than the threshold injection quality but higher than or equal to the threshold production quality, the produced gas may be collected. When the produced gas quality is lower than both the threshold injection quality and the threshold production quality, the produced gas may be disposed of or production of the produced gas may be terminated.

The decision to terminate production of a produced gas from a particular subterranean zone may generally be made when the produced gas quality of the produced gas is lower than the threshold production quality, the produced gas is not suitable for injection into a subterranean zone or is not needed for injection into a subterranean zone, and it is not desirable to otherwise dispose of the produced gas.

Production of a produced gas from a particular subterranean zone may be terminated in any suitable manner. In some embodiments, production of a produced gas from a subterranean zone may be terminated by "shutting in" production wells which are associated with the subterranean zone, thereby containing the produced gas and preventing the produced gas from becoming an environmental risk or hazard.

Following termination of production of the produced gas from the subterranean zone, injection of the displacing gas, one or more produced gases, or one or more other displacing agents into the subterranean zone may optionally be continued for the purpose of increasing the static reservoir pressure of the subterranean zone, to sequester carbon dioxide in the subterranean zone, or for any other purpose. In this regard, the method of the invention is preferably performed with monitoring of the static reservoir pressures in the subterranean zones and injection of substances into the subterranean zones until the initial static reservoir pressure of the subterranean zones is achieved.

BRIEF DESCRIPTION OF DRAWINGS

Embodiments of the invention will now be described with reference to the accompanying drawings, in which.

DETAILED DESCRIPTION

The present invention is a method for recovering natural gas from a group of subterranean zones containing natural gas. The method is comprised of injecting a displacing gas into a first subterranean zone in order to initiate the method, thereby producing a first produced gas from the first subterranean zone. The first produced gas is injected into one or more other subterranean zones to produce further produced gases from the other subterranean zone or zones.

Figure 1:
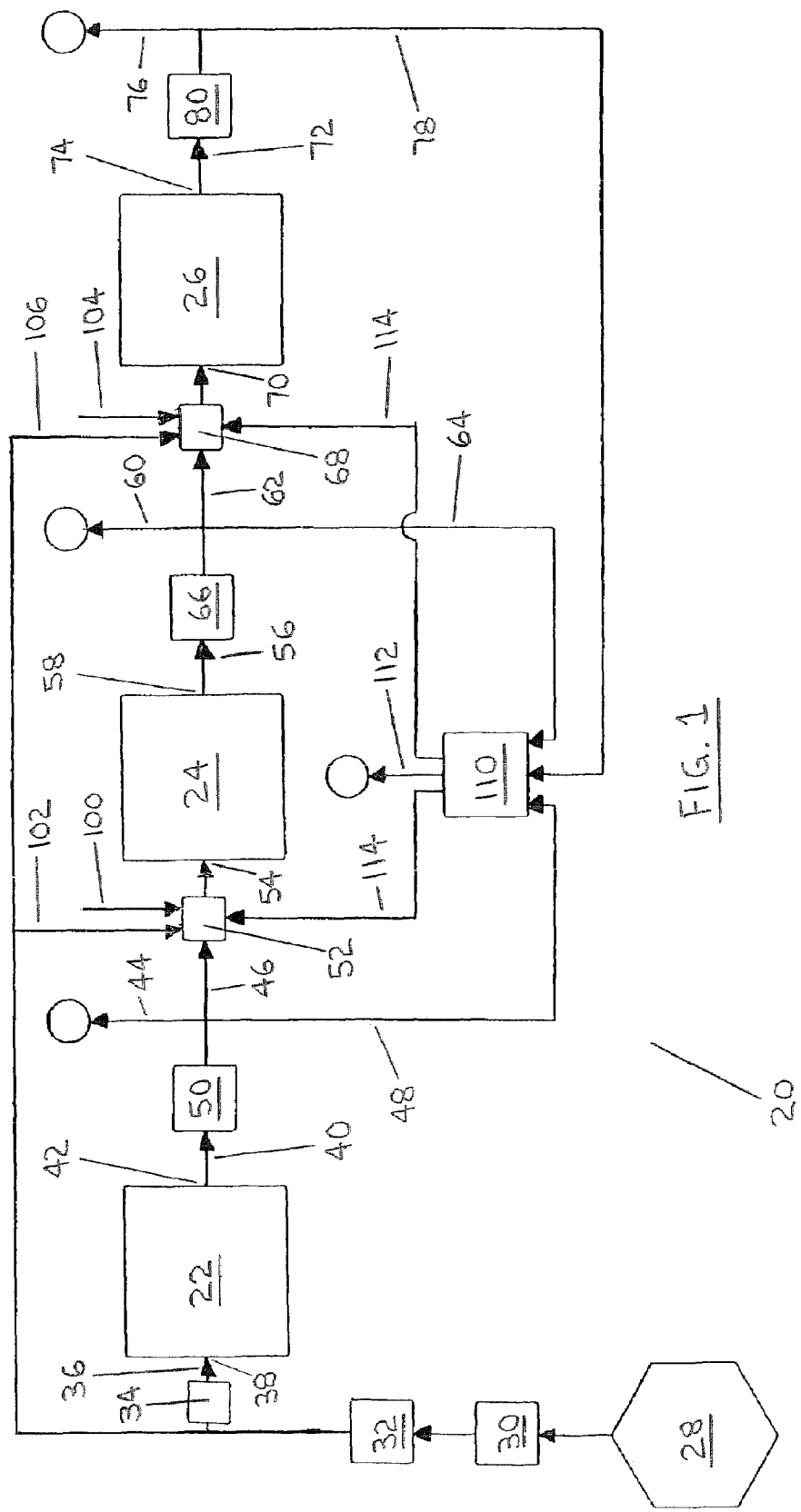
FIG. 1 is a schematic representation of an embodiment of the method of the invention in which the displacing gas is flue gas.

Referring to FIG. 1, there is provided a schematic representation of an embodiment of the method of the invention. The method as depicted in FIG. 1 includes optional and/or alternative aspects of the invention which will be identified in the description which follows.

FIG. 1 depicts a group (20) of subterranean zones consisting of a first subterranean zone (22), a second subterranean zone (24) and a third subterranean zone (26). The number of subterranean zones depicted in FIG. 1 is exemplary only. The invention may be practiced in conjunction with a group (20) of subterranean zones which includes any number of subterranean zones greater than one.

The subterranean zones (22,24,26) may be discrete natural gas reservoirs, regions of a single discrete reservoir, or a combination of discrete natural gas reservoirs and regions of discrete natural gas reservoirs. Any or all of the subterranean zones (22,24,26) may also be comprised of a number of "subzones" so that the method of the invention may effectively be performed in "parallel" in a number of subzones which together comprise a single subterranean zone.

The subterranean zones (22,24,26) are partially depleted of natural gas so that the method of the invention represents an "enhanced gas recovery" method. The amount of the original gas in place ("OGIP") which has previously been removed from each of the subterranean zones (22,24,26) before the method of the invention is performed in the subterranean zones (22,24,26) is dependent upon the characteristics of the subterranean zones (22,24,26). In some applications, it is preferable that at least about 60% of the OGIP has been removed from each of the subterranean zones (22,24,26). In applications in which one or more of the subterranean zones (22,24,26) is in pressure communication with heavy oil or bitumen containing formations which may be exploited using thermal recovery methods such as steam drive, in-situ combustion or steam assisted gravity drainage (SAGD), preferably at least about 30% of the OGIP has previously been removed from such subterranean zones (22,24,26).

The method of the invention is initiated by injecting a displacing gas into the first subterranean zone (22). The displacing gas may be any substance or combination of substances which is capable of displacing natural gas in the first subterranean zone (22).

In the embodiment of the invention depicted in FIG. 1, the displacing gas is flue gas which contains carbon dioxide and which also contains nitrogen as a secondary displacing gas. As a result, in FIG. 1 there is depicted a source (28) of flue gas for providing flue gas for use as the displacing gas.

The source (28) of flue gas may be comprised of any structure, apparatus, plant or facility which is capable of producing flue gas for use in the method of the invention.

As a first example, the source (28) of flue gas may be comprised of one or more industrial sources such as a hydrogen plant, a sweet gas processing plant, a petrochemical plant, a pulp mill, a sour gas processing plant etc., which may produce flue gas as a product or waste stream in its ongoing operations and from which it is feasible to obtain flue gas for use in the method of the invention.

As a second example, the source (28) of flue gas may be comprised of one or more local sources which produce flue gas either specifically for use in the method of the invention or which produce flue gas as a product or waste stream in the operation of the plant which performs the method of the invention. Such local sources of flue gas may use fuels delivered from elsewhere or may use as fuels produced gas which is produced from the subterranean zones (22,24,26).

In the latter case, flue gas obtained from burning produced gases which are produced from one or more of the subterranean zones (22,24,26) may be injected into the first subterranean zone (22) as the displacing gas in order to generate further produced gases in accordance with the method of the invention, thereby providing a self-contained closed loop method which produces little or no greenhouse gas emissions into the atmosphere.

Depending upon the quality of the flue gas provided by the source (28) of flue gas and upon the requirements of the method, it may be desirable to treat the flue gas to remove substances therefrom before it is used as the displacing gas.

For example, if the first subterranean zone (22) is a relatively shallow natural gas reservoir or a region thereof and/or if the first subterranean zone (22) is in pressure communication with a heavy oil or bitumen containing formation, the oxygen content of the displacing gas is preferably less than about 1% by volume of the displacing gas. If the first subterranean zone (22) is a relatively deep natural gas reservoir or a region thereof, the oxygen content of the displacing gas is preferably less than about 4% by volume of the displacing gas.

As a result, in FIG. 1 there is depicted an oxygen removal unit (30) for removing oxygen from the flue gas which is provided by the source (28) of flue gas. The oxygen removal unit (30) may be comprised of any apparatus or combination of apparatus which is capable of removing oxygen from flue gas. In the event that removal of oxygen from the flue gas is not required, the oxygen removal unit (30) may be bypassed.

It may also be desirable to treat the flue gas provided by the source (28) of flue gas to remove water therefrom before it is used as the displacing gas.

As a result, in FIG. 1 there is depicted a drying unit (32) for removing water from the flue gas which is provided by the source (28) of flue gas. The drying unit (32) may be comprised of any apparatus or combination of apparatus which is capable of removing water from flue gas. In the event that removal of water from the flue gas is not required, the drying unit (32) may be bypassed.

If necessary or desirable, the flue gas may be treated to remove other substances therefrom either in addition to or in substitution for the removal of oxygen and/or water as described above.

Following treatment of the flue gas from the source (28) of flue gas as may be necessary or desirable for its use as a displacing gas, the flue gas is directed through a first compressor (34) so that the flue gas may be pressurized to a pressure which is appropriate for injection of the flue gas into the first subterranean zone (22).

Once the flue gas has been treated as desired and is at a suitable pressure, it may be injected as a displacing gas (36) into the first subterranean zone (22) at a first injection location (38).

The displacing gas (36) is injected into the first subterranean zone (22) at the first injection location (38) while a first produced gas (40) is produced from the first subterranean zone (22) at a first production location (42) which is spaced from the first injection location (38). The displacing gas (36) may be injected continuously, intermittently or in any other suitable manner. The first production location (42) is spaced from the first injection location (38) so that the displacing gas (36) can migrate through the first subterranean zone (22) toward the first production location (42) while displacing natural gas toward the first production location (42).

The first injection location (38) is comprised of one or more injection wells (not shown) which penetrate the first subterranean zone (22). Similarly, the first production location (42) is comprised of one or more production wells (not shown) which penetrate the first subterranean zone (22).

Because it is flue gas, the displacing gas (36) is comprised of nitrogen and carbon dioxide, and may be further comprised of other substances. As the displacing gas (36) is injected into the first subterranean zone (22), the composition of the first produced gas (40) will change over time, first following nitrogen breakthrough at the first production location (42), and second following carbon dioxide breakthrough at the first production location (42).

Nitrogen breakthrough at the first production location (42) occurs before carbon dioxide breakthrough at the first production location (42) because nitrogen has a much lower solubility in water than does carbon dioxide, with the result that carbon dioxide is preferentially dissolved in connate water which is present in the first subterranean zone (22), thereby stripping the displacing gas (36) of carbon dioxide as it moves toward the first production location (42). As the solubility limits for carbon dioxide are approached in the first subterranean zone (22), the displacing gas (36) will contain increasing amounts of carbon dioxide as it moves toward the first production location (42).

Consequently, during a first stage of production of the first produced gas (40) from the first subterranean zone (22), the first produced gas (40) will consist essentially of natural gas which has been displaced to the first production location (42) by the displacing gas (36). The first stage of production ends upon nitrogen breakthrough at the first production location (42).

During a second stage of production of the first produced gas (40) from the first subterranean zone (22), the first produced gas (40) will be comprised of natural gas and increasing amounts of nitrogen.

During a third stage of production of the first produced gas (40) from the first subterranean zone (22), the first produced gas (40) will be comprised of natural gas with increasing amounts of nitrogen and carbon dioxide.

The first produced gas (40) may be directed into one or more of four different streams, only three of which are depicted in FIG. 1. First, the first produced gas (40) may be directed as a collection stream (44) to be collected as a marketable natural gas product. Second, the first produced gas (40) may be directed as an injection stream (46) to be injected into the second subterranean zone (24). Third, some or all of the first produced gas (40) may be directed as a combination stream (48) to be combined with other produced gases as will be described in detail below. Fourth, the first produced gas (40) may be directed as a disposal stream (not shown) to be disposed of in some manner as will be described below.

The first produced gas (40) may be directed through a first produced gas treatment unit (50) to remove substances such as solid particles and water therefrom. The first produced gas treatment unit (50) may be comprised of any suitable structure, apparatus or device or combination of suitable structures, apparatus or devices. For example, the first produced gas treatment unit (50) may be comprised of a separator vessel (not shown) and/or a drying unit (not shown).

As depicted in FIG. 1, the first produced gas (40) is directed through the first produced gas treatment unit (50) before the first produced gas (40) is directed into one or more different streams. Alternatively, one or more of the streams into which the first produced gas (40) is directed may be treated separately as desired or treatment of the first produced gas (40) may be bypassed altogether.

The injection stream (46) of the first produced gas (40) is injected into the second subterranean zone (24). If pressurization of the injection stream (46) is required, the injection stream (46) may be directed through a second compressor (52) before it is injected into the second subterranean zone (24).

The injection stream (46) of the first produced gas (40) is injected into the second subterranean zone (24) at a second injection location (54) while a second produced gas (56) is produced from the second subterranean zone (24) at a second production location (58) which is spaced from the second injection location (54). The injection stream (46) may be injected continuously, intermittently or in any other suitable manner. The second production location (58) is spaced from the second injection location (54) so that the injection stream (46) can migrate through the second subterranean zone (24) toward the second production location (58) while displacing natural gas toward the second production location (58).

The second injection location (54) is comprised of one or more injection wells (not shown) which penetrate the second subterranean zone (24). Similarly, the second production location (58) is comprised of one or more production wells (not shown) which penetrate the second subterranean zone (24).

The composition of the second produced gas (56) will change over time following breakthrough of the injection stream (46) of the first produced gas (40) at the second production location (58).

The specific composition of the second produced gas (56) will depend upon the composition of the natural gas contained in the second subterranean zone (24) and upon the composition of the injection stream (46) of the first produced gas (40), which in turn will depend upon which stage of production of the first produced gas (40) the injection stream (46) is derived from.

As a first example, the injection stream (46) of the first produced gas (40) may be derived from the second stage of production of the first produced gas (40) in which the first produced gas (40) is comprised of natural gas and increasing amounts of nitrogen. In this first example, in a first stage of production of the second produced gas (56) the second produced gas (56) will consist essentially of natural gas, and in a second stage of production of the second produced gas (56) the second produced gas (56) will be comprised of natural gas and increasing amounts of nitrogen.

As a second example, the injection stream (46) of the first produced gas (40) may be derived from the third stage of production of the first produced gas (40) in which the first produced gas (40) is comprised of natural gas and increasing amounts of nitrogen and carbon dioxide. In this second example, in a first stage of production of the second produced gas (56) the second produced gas (56) will consist essentially of natural gas, in a second stage of production of the second produced gas (56) the second produced gas (56) will be comprised of natural gas and increasing amounts of nitrogen, and in a third stage of production of the second produced gas (56) the second produced gas (56) will be comprised of natural gas and increasing amounts of nitrogen and carbon dioxide.

The second produced gas (56) may be directed into one or more of four different streams, only three of which are depicted in FIG. 1. First, the second produced gas (56) may be directed as a collection stream (60) to be collected as a marketable natural gas product. Second, the second produced gas (56) may be directed as an injection stream (62) to be injected into the third subterranean zone (26). Third, some or all of the second produced gas (56) may be directed as a combination stream (64) to be combined with other produced gases as will be described in detail below. Fourth, the second produced gas (56) may be directed as a disposal stream (not shown) to be disposed of in some manner as will be described below.

The second produced gas (56) may be directed through a second produced gas treatment unit (66) to remove substances such as solid particles and water therefrom. The second produced gas treatment unit (66) may be comprised of any suitable structure, apparatus or device or combination of suitable structures, apparatus or devices. For example, the second produced gas treatment unit (66) may be comprised of a separator vessel (not shown) and/or a drying unit (not shown).

As depicted in FIG. 1, the second produced gas (56) is directed through the second produced gas treatment unit (66) before the second produced gas (56) is directed into one or more different streams. Alternatively, one or more of the streams into which the second produced gas (56) is directed may be treated separately as desired or treatment of the second produced gas (56) may be bypassed altogether.

The injection stream (62) of the second produced gas (56) is injected into the third subterranean zone (26). If pressurization of the injection stream (62) is required, the injection stream (62) may be directed through a third compressor (68) before it is injected into the third subterranean zone (26).

The injection stream (62) of the second produced gas (56) is injected into the third subterranean zone (26) at a third injection location (70) while a third produced gas (72) is produced from the third subterranean zone (26) at a third production location (74) which is spaced from the third injection location (70). The injection stream (62) may be injected continuously, intermittently or in any other suitable manner. The third production location (74) is spaced from the third injection location (70) so that the injection stream (62) can migrate through the third subterranean zone (26) toward the third production location (74) while displacing natural gas toward the third production location (74).

The third injection location (70) is comprised of one or more injection wells (not shown) which penetrate the third subterranean zone (26). Similarly, the third production location (74) is comprised of one or more production wells (not shown) which penetrate the third subterranean zone (26).

The composition of the third produced gas (72) will change over time following breakthrough of the injection stream (62) of the second produced gas (56) at the third production location (74).

The specific composition of the third produced gas (72) will depend upon the composition of the natural gas which is contained in the third subterranean zone (26) and upon the composition of the injection stream (62), which in turn will depend upon which stage of production of the second produced gas (56) the injection stream (62) of the second produced gas (56) is derived from.

As a first example, the injection stream (62) of the second produced gas (56) may be derived from the second stage of production of the second produced gas (56) in which the second produced gas (56) is comprised of natural gas and increasing amounts of nitrogen. In this first example, in a first stage of production of the third produced gas (72) the third produced gas (72) will consist essentially of natural gas, and in a second stage of production of the third produced gas (72) the third produced gas (72) will be comprised of natural gas and increasing amounts of nitrogen.

As a second example, the injection stream (62) of the second produced gas (56) may be derived from the third stage of production of the second produced gas (56) in which the second produced gas (56) is comprised of natural gas and increasing amounts of nitrogen and carbon dioxide. In this second example, in a first stage of production of the third produced gas (72) the third produced gas (72) will consist essentially of natural gas, in a second stage of production of the third produced gas (72) the third produced gas (72) will be comprised of natural gas and increasing amounts of nitrogen, and in a third stage of production of the third produced gas (72) the third produced gas (72) will be comprised of natural gas and increasing amounts of nitrogen and carbon dioxide.

As depicted in FIG. 1, the third subterranean zone (26) is the final subterranean zone in which the method is performed. As a result, as depicted in FIG. 1, the third produced gas (72) may be directed into one or more of three different streams, only two of which are depicted in FIG. 1. First, the third produced gas (72) may be directed as a collection stream (76) to be collected as a marketable natural gas product. Second, some or all of the third produced gas (72) may be directed as a combination stream (78) to be combined with other produced gases as will be described in detail below. Third, the third produced gas (72) may be directed as a disposal stream (not shown) to be disposed of in some manner as will be described below.

If the method of the invention is performed using more than three subterranean zones, the third produced gas (72) may be directed into a fourth stream which is an injection stream (not shown) to be injected into a fourth subterranean zone (not shown), in a similar manner as is described with respect to the injection stream (62) of the second produced gas (56).

The determination of which stream or streams the produced gases (40,56,72) are directed into is in most applications of the invention made having regard to the quality of the produced gases (40,56,72). The quality of the produced gases (40,56) preferably relates to the composition of the produced gases (40,56,72).

For example, in the embodiments depicted in FIG. 1, the first produced gas (40) has a first produced gas quality, the second produced gas (56) has a second produced gas quality, and the third produced gas (72) has a third produced gas quality. If the produced gases (40,56,72) are treated, the produced gas quality preferably relates to the quality of the treated produced gases (40,56,72).

Each of the produced gases (40,56,72) has a threshold production quality. The threshold production quality defines a minimum quality in order for the produced gases (40,56,72) to be directed into the collection streams (44,60,76). The threshold production quality may be the same for each of the produced gases (40,56,72) or may vary amongst the produced gases (40,56,72).

Each of the produced gases (40,56,72) has a threshold injection quality. The threshold injection quality defines a minimum quality in order for the produced gases (40,56,72) to be directed into the injection streams (46,62). The threshold injection quality may be the same for each of the produced gases (40,56,72) or may vary amongst the produced gases (40,56,72).

In most applications of the invention, the threshold production quality is a higher quality than the threshold injection quality. In some applications of the invention, however, the threshold injection quality may be a higher quality than the threshold production quality.

In most applications of the invention, the produced gases (40,56,72) are not directed into the combination streams (48,64,78). As a result, in most applications of the invention, the produced gases (40,56,72) are directed into the collection streams (44,60,76), the injection streams (46,62) and/or the disposal streams (not shown).

In most applications of the invention, the injection streams (46,62) of the produced gases (40,56,72) are injected only into the next subsequent subterranean zone. In other words, the injection stream (46) of the first produced gas (40) is injected only into the second subterranean zone (24), and the injection stream (62) of the second produced gas (56) is injected only into the third subterranean zone (26). In some embodiments, however, either of the injection streams (46,62) of the produced gases (40,56) may be injected into either or both of the subterranean zones (24,26).

The threshold production quality preferably represents the minimum quality which is required in order for the produced gas (40,56,72) to be considered to be a "marketable natural gas product". A marketable natural gas product may be defined by a maximum allowable production amount of one or more substances or by a minimum allowable production amount of one or more substances.

As a first example, a produced gas (40,56,72) may be considered to be a marketable natural gas product if it contains no more than a maximum allowable production amount of carbon dioxide. The maximum allowable production amount of carbon dioxide may vary, depending upon the requirements of the purchaser or transporter of the natural gas product. Due, however, to the corrosiveness of carbon dioxide, the maximum allowable production amount of carbon dioxide will typically be a relatively small amount of carbon dioxide. In some applications of the invention, the maximum allowable production amount of carbon dioxide is about 2 percent carbon dioxide by volume of the produced gas (40, 56,72).

As a second example, a produced gas (40,56,72) may be considered to be a marketable natural gas product if it contains no more than a maximum allowable production amount of nitrogen. The maximum allowable production amount of nitrogen may vary, depending upon the requirements of the purchaser or transporter of the natural gas product. In some applications of the invention, the maximum allowable production amount of nitrogen is about 20 percent nitrogen by volume of the produced gas (40,56,72).

The threshold injection quality preferably represents the minimum quality which is required in order for the produced gas (40,56,72) to be suitable for injection into a subterranean zone as a displacing agent for enhanced gas recovery operations. A suitable displacing agent for enhanced gas recovery operations may be defined by a maximum allowable injection amount of one or more substances or by a minimum allowable injection amount of one or more substances.

For example, a produced gas (40,56,72) may be considered to be a suitable displacing agent if it contains no more than a maximum allowable injection amount of carbon dioxide and/or other corrosive substances.

As a result, in some applications of the invention it may be desirable to avoid or at least minimize the presence of carbon dioxide in the injection streams (46,62) of the produced gases (40,56,72), in order to avoid or at least minimize the corrosive effects of carbon dioxide on injection wells and other equipment which is associated with the subterranean zones (22,24, 26).

In some applications of the invention, the maximum allowable injection amount of carbon dioxide in the injection streams (46,62) is not significantly higher than the amount of carbon dioxide which is naturally occurring in the natural gas contained in the subterranean zones (22,24,26). In other words, in some applications there is preferably very little if any carbon dioxide added to the natural gas contained in the subterranean zones (22,24,26) as a result of its production as a produced gas.

In other applications of the invention the corrosive effects of carbon dioxide may be tolerated to some extent in the injection wells and other equipment associated with the subterranean zones (24,26) and the maximum allowable injection amount of carbon dioxide in the injection streams (46,62) may be higher or even significantly higher than the amount of carbon dioxide which is naturally occurring in the natural gas.

As a result, in some applications of the invention, the method may proceed as follows.

To initiate the method, the displacing gas (36) is injected into the first subterranean zone (22) at the first injection location (38) in order to displace natural gas contained in the first subterranean zone (22) toward the first production location (42) and produce the first produced gas (40) from the first subterranean zone (22). The first produced gas quality will change over time as the displacing gas (36) is injected into the first subterranean zone (22).

During the first stage of production of the first produced gas (40) from the first subterranean zone (22), the first produced gas (40) consists essentially of natural gas and is collected in the collection stream (44) as a marketable gas product, assuming that the first produced gas quality is higher than or equal to the threshold production quality of the first produced gas (40).

During the second stage of production of the first produced gas (40) from the first subterranean zone (22), the first produced gas (40) comprises natural gas and increasing amounts of nitrogen. Assuming that the maximum allowable production amount of nitrogen in the first produced gas (40) is about 20 percent nitrogen by volume of the first produced gas (40) and assuming that the first produced gas quality is otherwise higher than or equal to the threshold production quality of the first produced gas (40), the first produced gas (40) may continue to be collected in the collection stream (44) as a marketable gas product until the amount of nitrogen in the first produced gas (40) exceeds about 20 percent.

Once the amount of nitrogen in the first produced gas (40) exceeds about 20 percent nitrogen by volume of the first produced gas (40), collection of the first produced gas (40) is terminated and the first produced gas (40) is directed to the injection stream (46) for injection into the second subterranean zone (24) at the second injection location (54), assuming that the first produced gas quality is otherwise higher than or equal to the threshold injection quality of the first produced gas (40).

During the third stage of production of the first produced gas (40) from the first subterranean zone (22), the first produced gas (40) comprises natural gas and increasing amounts of nitrogen and carbon dioxide.

If the maximum allowable injection amount of carbon dioxide in the first produced gas (40) is such that the first produced gas quality is lower than the threshold injection quality of the first produced gas (40) immediately upon carbon dioxide breakthrough at the first production location (42), injection of the first produced gas (40) into the second subterranean zone (24) will be terminated at the beginning of the third stage of production of the first produced gas (40) from the first subterranean zone (22).

If the maximum allowable injection amount of carbon dioxide in the first produced gas (40) is such that some amount of added carbon dioxide can be tolerated in the injection stream (46), and assuming that the first produced gas quality is otherwise higher than the threshold injection quality, the injection of the first produced gas (40) into the second subterranean zone (24) may continue until the maximum allowable injection amount of carbon dioxide is exceeded in the first produced gas (40), at which time the injection of the first produced gas (40) into the second subterranean zone (24) will be terminated.

Once the first produced gas (40) is no longer suitable for either collection or for injection due to the first produced gas quality, the first produced gas (40) may be directed to the disposal stream to be otherwise disposed of, or production of the first produced gas (40) from the first subterranean zone (22) may be terminated.

Similarly, if the first produced gas (40) is no longer needed for injection into the second subterranean zone (24), the first produced gas (40) may be directed to the disposal stream to be otherwise disposed of, or production of the first produced gas (40) from the first subterranean zone (22) may be terminated. The first produced gas (40) will cease to be needed for injection into the second subterranean zone (24) once sufficient volumes of the first produced gas (40) have been injected into the second subterranean zone (24) to achieve the objectives of the method for the second subterranean zone (24).

If production of the first produced gas (40) from the first subterranean zone (22) is terminated, the displacing gas (36) or some other gas or gases may optionally continue to be injected into the first subterranean zone (22) while the production wells associated with the first subterranean zone (22) are shut in for the purpose of sequestering carbon dioxide and/or increasing the static reservoir pressure of the first subterranean zone (22).

If the amount of the first produced gas (40) which is available and suitable for injection into the second subterranean zone (22) is less than the amount of displacing agent which is required for injection into the second subterranean zone (24) in order to achieve the objectives of the method in the second subterranean zone (24), alternate displacing agents may be injected into the second subterranean zone (24) in order to achieve the objectives of the method in the second subterranean zone (24).

As a first example, flue gas (102) may be injected into the second subterranean zone (24) as a displacing agent.

As a second example, an amount of air (100) (limited due to the potential hazard because of the oxygen contained therein) may be injected into the second subterranean zone (24).

The second produced gas (40) is produced at the second production location (58) of the second subterranean zone (24). The second produced gas quality will change over time as the first produced gas (40) is injected into the second subterranean zone (24).

During the first stage of production of the second produced gas (56) from the second subterranean zone (24), the second produced gas (56) consists essentially of natural gas and is collected in the collection stream (60) as a marketable gas product, assuming that the second produced gas quality is higher than or equal to the threshold production quality of the second produced gas (56).

During the second stage of production of the second produced gas (56) from the second subterranean zone (24), the second produced gas (56) comprises natural gas and increasing amounts of nitrogen. Assuming that the maximum allowable production amount of nitrogen in the second produced gas (56) is about 20 percent nitrogen by volume of the second produced gas (56) and assuming that the second produced gas quality is otherwise higher than or equal to the threshold production quality of the second produced gas (56), the second produced gas (56) may be collected in the collection stream (60) until the amount of nitrogen in the second produced gas (56) exceeds about 20 percent.

Once the amount of nitrogen in the second produced gas (56) exceeds about 20 percent nitrogen by volume of the second produced gas (56), collection of the second produced gas (56) is terminated and the second produced gas (56) is directed to the injection stream (62) for injection into the third subterranean zone (26) at the third injection location (70), assuming that the second produced gas quality is otherwise higher than or equal to the threshold injection quality of the second produced gas (56).

If the threshold injection quality of the first produced gas (40) does not tolerate any significant amount of added carbon dioxide due to the corrosive effects of carbon dioxide on equipment associated with the second subterranean zone (24), the injection stream (46) of the first produced gas (40) will contain relatively little carbon dioxide. As a result, the second stage of production of the second produced gas (56) may continue almost indefinitely as the nitrogen content of the second produced gas (56) increases and the natural gas content of the second produced gas (56) decreases, since very little or no carbon dioxide is likely at any time to be contained within the second produced gas (56). In this case, the injection of the second produced gas (56) into the third subterranean zone (26) may conceivably continue until the amount of the second produced gas (56) which is injected into the third subterranean zone (26) is sufficient to achieve the objectives of the invention in the third subterranean zone (26).

If the threshold injection quality of the first produced gas (40) does tolerate some amount of added carbon dioxide, the second produced gas (56) may enter the third stage of production in which the second produced gas comprises natural gas with increasing amounts of nitrogen and carbon dioxide.

If the maximum allowable injection amount of carbon dioxide in the second produced gas (56) is such that the second produced gas quality is lower than the threshold injection quality of the second produced gas (56) immediately upon carbon dioxide breakthrough at the second production location (58), injection of the second produced gas (56) into the third subterranean zone (26) will be terminated at the beginning of the third stage of production of the second produced gas (56) from the second subterranean zone (24).

If the maximum allowable injection amount of carbon dioxide in the second produced gas (56) is such that some amount of added carbon dioxide can be tolerated in the injection stream (62), and assuming that the second produced gas quality is otherwise higher than the threshold injection quality, the injection of the second produced gas (56) into the third subterranean zone (26) may continue until the maximum allowable injection amount of carbon dioxide is exceeded in the second produced gas (56), at which time the injection of the second produced gas (56) into the third subterranean zone (26) will be terminated.

Once the second produced gas (56) is no longer suitable for either collection or for injection due to the second produced gas quality, the second produced gas (56) may be directed to the disposal stream to be otherwise disposed of, or production of the second produced gas (56) from the second subterranean zone (24) may be terminated.

Similarly, if the second produced gas (56) is no longer needed for injection into the third subterranean zone (26), the second produced gas (56) may be directed to the disposal stream to be otherwise disposed of, or production of the second produced gas (56) from the second subterranean zone (24) may be terminated. The second produced gas (56) will cease to be needed for injection into the third subterranean zone (26) once sufficient volumes of the second produced gas (56) have been injected into the third subterranean zone (26) to achieve the objectives of the method for the third subterranean zone (26).

If production of the second produced gas (56) from the second subterranean zone (24) is terminated, the first produced gas (40) or some other gas or gases may optionally continue to be injected into the second subterranean zone (24) while the production wells associated with the second subterranean zone (24) are shut in for the purpose of sequestering carbon dioxide and/or increasing the static reservoir pressure of the second subterranean zone (24).

If the amount of the second produced gas (56) which is available and suitable for injection into the third subterranean zone (26) is less than the amount of displacing agent which is required for injection into the third subterranean zone (26) in order to achieve the objectives of the method in the third subterranean zone (26), alternate displacing agents may be injected into the third subterranean zone (26) in order to achieve the objectives of the method in the third subterranean zone (26).

As a first example, flue gas (106) may be injected into the third subterranean zone (26) as a displacing agent.

As a second example, an amount of air (104) (limited due to the potential hazard because of the oxygen contained therein) may be injected into the third subterranean zone (26) as a displacing agent.

The third produced gas (72) is produced at the third production location (74) of the third subterranean zone (26). The third produced gas quality will change over time as the second produced gas (56) is injected into the third subterranean zone (26).

During the first stage of production of the third produced gas (72) from the third subterranean zone (26), the third produced gas (72) consists essentially of natural gas and is collected in the collection stream (76) as a marketable gas product, assuming that the third produced gas quality is higher than or equal to the threshold production quality of the third produced gas (72).

During the second stage of production of the third produced gas (72) from the third subterranean zone (26), the third produced gas (72) comprises natural gas and increasing amounts of nitrogen. Assuming that the maximum allowable production amount of nitrogen in the third produced gas (72) is about 20 percent nitrogen by volume of the third produced gas (72) and assuming that the third produced gas quality is otherwise higher than or equal to the threshold production quality of the third produced gas (72), the third produced gas (72) may be collected in the collection stream (76) until the amount of nitrogen in the third produced gas (72) exceeds about 20 percent.

Once the amount of nitrogen in the third produced gas (72) exceeds about 20 percent nitrogen by volume of the third produced gas (72), collection of the third produced gas (72) is terminated. In the most simple application of the method involving the three subterranean zones (22,24,26), production of the third produced gas (72) is terminated when collection of the third produced gas (72) is terminated, since the third produced gas (72) is not required as a displacing agent in a subsequent subterranean zone.

If production of the third produced gas (72) from the third subterranean zone (26) is terminated, the second produced gas (56) or some other gas or gases may optionally continue to be injected into the third subterranean zone (26) while the production wells associated with the third subterranean zone (26) are shut in for the purpose of sequestering carbon dioxide and/or increasing the static reservoir pressure of the third subterranean zone (26).

As described above, in simple applications of the invention, the method involves injection of the displacing gas (36) into the first subterranean zone (22), injection of the first produced gas (40) into the second subterranean zone (24), and injection of the second produced gas (56) into the third subterranean zone (26), in a simple "chain" or "cascading" manner.

In more complex applications of the invention, the method may not necessarily proceed in a simple chain or cascading manner, so that the flexibility and adaptability of the method of the invention to different types and sizes of subterranean zone can be enhanced.

As a first example (not shown), any of the produced gases (40,56,72) may be injected into any of the subterranean zones (22,24,26) as a displacing agent, to sequester carbon dioxide, to increase the static reservoir pressure in any of the subterranean zones (22,24,26), or for any other purpose.

As a second example, referring to FIG. 1, the combination streams (48,64,78) of any or all of the produced gases (40,56, 72) may be combined with each other in order to obtain a combined produced gas (110) which may be directed into a combined collection stream (112), one or more combined injection streams (114) or a combined disposal stream (not shown). The combined produced gas (110) will have a combined produced gas quality and the determination of whether to collect the combined produced gas (110), inject the combined produced gas (110), or dispose of the combined produced gas (110) may be made having regard to a threshold production quality for the combined produced gas (110) and a threshold injection quality for the combined produced gas (110).

As a third example (not shown), one or more of the produced gases (40,56,72) may be combined with one or more other displacing agents in order to obtain a modified produced gas or a modified combined produced gas. The other displacing agent or agents may be comprised of any substance which will provide a modified produced gas or modified combined produced gas which is suitable for use as a displacing agent. In some embodiments the other displacing agent or agents may be comprised of air and/or flue gas. By combining the produced gases (40,56,72) with one or more other displacing agents, the other displacing agents can serve as an "extender" for the produced gases (40,56,72).

The disposal streams of the produced gases (40,56,72) may be disposed of in any suitable manner. In some circumstances, the disposal streams may be suitable for use as a fuel by itself or with a make up fuel in local equipment even if the produced gas quality is lower than the threshold production quality and the threshold injection quality, and in some circumstances may even be suitable for burning to produce flue gas for use as the displacing gas (36). In other circumstances, the disposal streams of the produced gases (40,56,72) may directly be suitable for use for some industrial purposes or may be treated and/or processed for use for some industrial purposes.

By utilizing the more complex applications of the invention, the method may be performed in a group of subterranean zones (22,24,26) of any size or relative size, since displacing agents for injection into any of the subterranean zones (22, 24,26) may be obtained from sources other than the produced gas (40,45,72) produced from the previous subterranean zone (22,24,26).

In some applications of the invention, the subterranean zones (22,24,26) are preferably sized so that reasonable assurance may be obtained that the volume of the injection stream (46,62) of a produced gas (40,56) produced from a subterranean zone (22,24) will be sufficient to satisfy the required volume of displacing agent in the subsequent subterranean zone (24,26).

For example, in some preferred applications of the invention, particularly for subterranean zones (22,24,26) having similar static reservoir pressures, the pore volume of the first subterranean zone (22) is preferably greater than or equal to the pore volume of the second subterranean zone (24), the pore volume of the second subterranean zone (24) is preferably greater than or equal to the pore volume of the third subterranean zone (26), and so on. Most preferably, the volume of the first subterranean zone (22) is at least about two times the volume of the second subterranean zone (24), the pore volume of the second subterranean zone (24) is at least about two times the pore volume of the third subterranean zone (26), and so on.

Similarly, in some applications of the invention, the static reservoir pressures of the subterranean zones (22,24,26) are preferably coordinated in order to minimize unnecessary pressurization of the displacing gas (36) and the injection streams (46,62) of the produced gases (40,56).

For example, in some preferred applications of the invention, particularly for subterranean zones (22,24,26) having similar pore volumes, the static reservoir pressure of the first subterranean zone (22) is preferably greater than or equal to the static reservoir pressure of the second subterranean zone (24), the static reservoir pressure of the second subterranean zone (24) is preferably greater than or equal to the static reservoir pressure of the third subterranean zone (26), and so on. Most preferably, the static reservoir pressure of the first subterranean zone (22) is at least about two times the static reservoir pressure of the second subterranean zone (24), the static reservoir pressure of the second subterranean zone (24) is at least about two times the static reservoir pressure of the third subterranean zone (26), and so on.

The invention may, however, be practiced in subterranean zones having a variety of sizes and static reservoir pressures within or outside the parameters mentioned above, and the design and/or optimization of the implementation of the invention in a particular group of subterranean zones will be apparent or determinable to a person skilled in the art.

Laboratory experiments and numerical simulations directed at the method of the invention were conducted using both a simulated flue gas consisting of a mixture of 14% carbon dioxide and 86% nitrogen as a displacing gas (36) and using pure carbon dioxide as a displacing gas (36), with both being separately injected into a simulated first subterranean zone (22) consisting of a sand packed tube containing methane.

Figure 2:
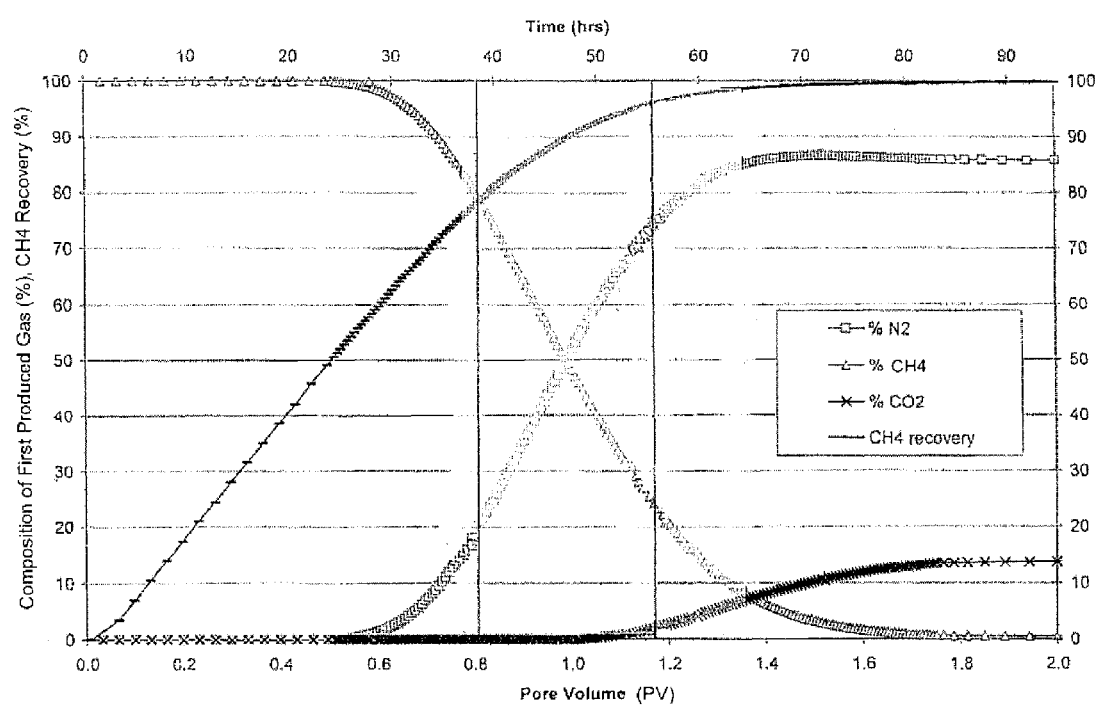
FIG. 2 is a graph depicting production stages at a production location of a first subterranean zone based upon laboratory experiments involving injection of a simulated flue gas containing 14% carbon dioxide and 86% nitrogen as a displacing gas into a simulated first subterranean zone containing methane.

Referring to FIG. 2, three stages of production from the simulated first subterranean zone (22) are depicted for the laboratory experiments in which the simulated flue gas consisting of the mixture of 14% carbon dioxide and 86% nitrogen was injected into the sand packed tube containing methane. In the laboratory experiments depicted in FIG. 2, the displacing gas (36) was injected at a pressure of 100 psi and with a displacement velocity of 5.2 meters per day.

During the first stage of production as depicted in FIG. 2, the first produced gas (40) contains less than 20 percent nitrogen by volume of the first produced gas (40). During the second stage of production as depicted in FIG. 2, the first produced gas (40) contains greater than 20 percent nitrogen by volume of the first produced gas (40), but less than 2 percent carbon dioxide by volume of the first produced gas (40). During the third stage of production as depicted in FIG. 2, the first produced gas (40) contains greater than 2 percent carbon dioxide by volume of the first produced gas (40).

Figure 3:
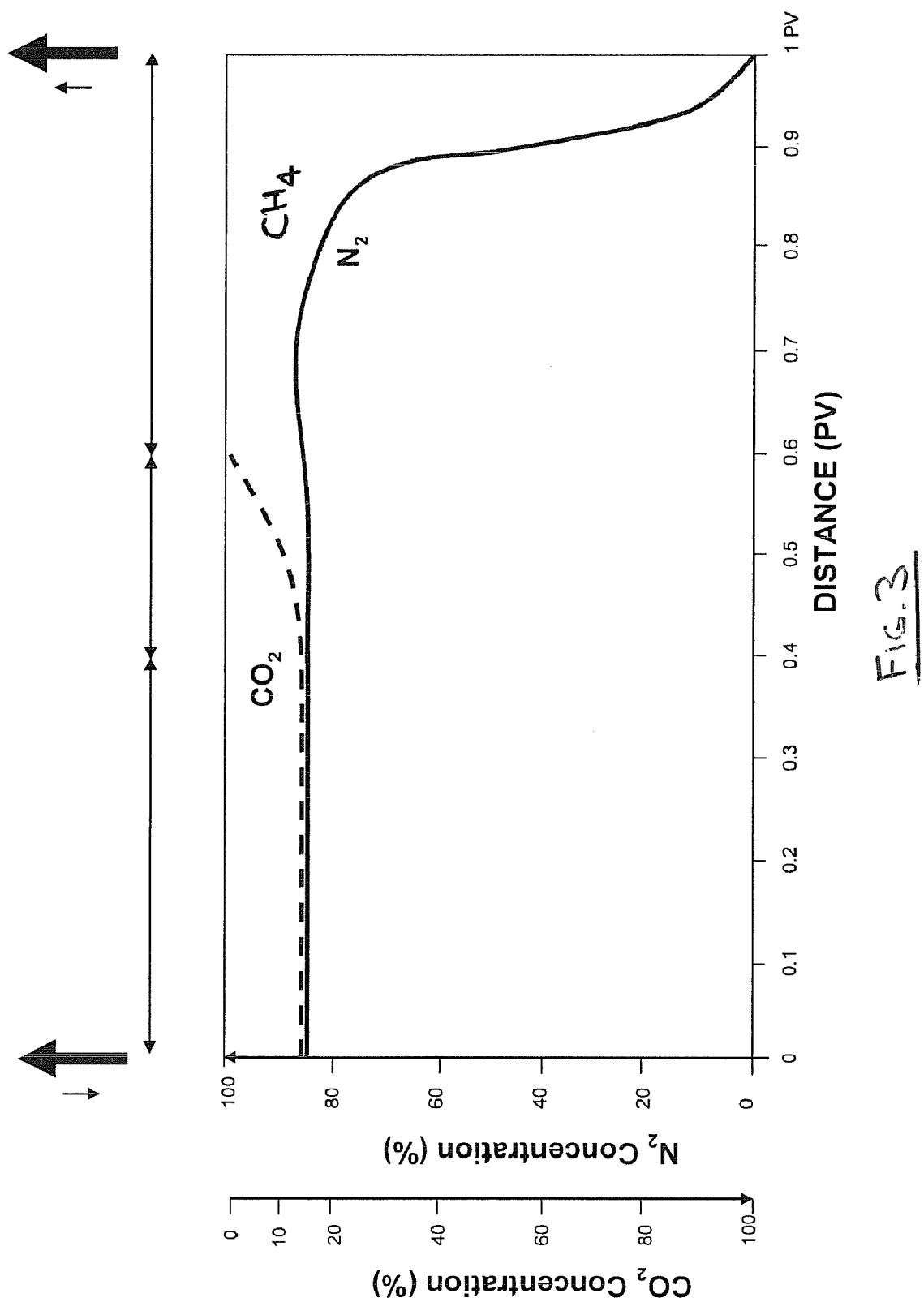
FIG. 3 is an illustrative graph schematically depicting the composition of gases contained in a first subterranean zone between an injection location and a production location based upon laboratory experiments involving injection of a simulated flue gas containing 14% carbon dioxide and 86% nitrogen as a displacing gas into a simulated first subterranean zone containing methane, at the moment of nitrogen breakthrough at the production location.

Referring to FIG. 3, an expected typical composition of gases contained in the first subterranean zone between an injection location and a production location based upon laboratory experiments involving injection of a simulated flue gas containing 14% carbon dioxide and 86% nitrogen as a displacing gas into the sand packed tube containing methane is depicted at the moment of nitrogen breakthrough at the production location.

Based upon the laboratory experiments and numerical simulations, it is estimated that the recovery of natural gas from a group of subterranean zones will be greater using the method of the invention than if flue gas or carbon dioxide is simply injected as a displacing agent into each of the subterranean zones.

This estimated greater recovery of natural gas is expected to be realized in those of the subterranean zones in which produced gas is injected as a displacing agent, and is believed to be due to the composition of the produced gases which are used as displacing agents in comparison with the composition of the flue gas which is used as the displacing agent in the first subterranean zone. In particular, the produced gases which are used as displacing agents in the method of the invention will in most circumstances contain relatively little carbon dioxide and nitrogen in comparison with flue gas, and may also contain significant amounts of methane (for example, perhaps averaging between about 40% and about 50% methane) and other constituents of natural gas.

The method of the invention also potentially provides for a significant minimization or even elimination of operational problems such as damage to equipment which may be associated with the use of corrosive displacing agents such as flue gas, since the composition of the produced gases which are used as the displacing agents in the second and subsequent subterranean zones may be controlled using the method of the invention.

Finally, the method of the invention potentially provides for increased opportunities for carbon dioxide sequestration relative to the quantities of marketable natural gas which are produced using the method of the invention, in comparison with conventional methods in which the displacing gas (36) is injected into each of the subterranean zones (22,24,26).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A method for recovering natural gas from a group of subterranean zones containing natural gas, the method comprising:
   (a) injecting an amount of a displacing gas into a first subterranean zone at a first injection location associated with the first subterranean zone;
   (b) producing a first produced gas from the first subterranean zone at a first production location associated with the first subterranean zone, wherein the first production location is spaced from the first injection location, wherein the first produced gas has a first produced gas quality, and wherein the first produced gas quality changes over time following breakthrough of the first displacing gas at the first production location;
   (c) collecting an amount of the first produced gas, wherein the first produced gas quality of the collected first produced gas is higher than or equal to a threshold production quality for the first produced gas;
   (d) injecting an amount of the first produced gas into a second subterranean zone at a second injection location associated with the second subterranean zone, wherein the first produced gas quality of the injected first produced gas is higher than or equal to a threshold injection quality for the first produced gas;
   (e) producing a second produced gas from the second subterranean zone at a second production location associated with the second subterranean zone, wherein the second production location is spaced from the second injection location, wherein the second produced gas has a second produced gas quality, and wherein the second produced gas quality changes over time following breakthrough of the second displacing gas at the second production location; and (f) collecting an amount of the second produced gas, wherein the second produced gas quality of the collected second produced gas is higher than or equal to a threshold production quality for the second produced gas.

2. The method as claimed in claim 1 wherein the displacing gas is comprised of carbon dioxide.

3. The method as claimed in claim 2 wherein the first produced gas quality is lower than the threshold production quality for the first produced gas if the first produced gas includes more than a maximum allowable production amount of carbon dioxide for the first produced gas.

4. The method as claimed in claim 3 wherein the maximum allowable production amount of carbon dioxide included in the first produced gas is about 2 percent carbon dioxide by volume of the first produced gas.

5. The method as claimed in claim 3 wherein the first produced gas quality is lower than the threshold injection quality for the first produced gas if the first produced gas includes more than a maximum allowable injection amount of carbon dioxide for the first produced gas.

6. The method as claimed in claim 3 wherein the second produced gas quality is lower than the threshold production quality for the second produced gas if the second produced gas includes more than a maximum allowable production amount of carbon dioxide for the second produced gas.

7. The method as claimed in claim 6 wherein the maximum allowable production amount of carbon dioxide included in the second produced gas is about 2 percent carbon dioxide by volume of the second produced gas.

8. The method as claimed in claim 6 wherein amounts of the first produced gas and the second produced gas are combined to provide a combined produced gas having a combined produced gas quality and wherein the combined produced gas quality is lower than a threshold production quality for the combined produced gas if the combined produced gas includes more than a maximum allowable production amount of carbon dioxide for the combined produced gas.

9. The method as claimed in claim 8 wherein the maximum allowable production amount of carbon dioxide included in the combined produced gas is about 2 percent carbon dioxide by volume of the combined produced gas.

10. The method as claimed in claim 6, further comprising:
(g) injecting an amount of the second produced gas into a third subterranean zone at a third injection location associated with the third subterranean zone, wherein the second produced gas quality of the injected second produced gas is higher than or equal to a threshold injection quality for the second produced gas;
(h) producing a third produced gas from the third subterranean zone at a third production location associated with the third subterranean zone, wherein the third production location is spaced from the third injection location, wherein the third produced gas has a third produced gas quality, and wherein the third produced gas quality changes over time following breakthrough of the third displacing gas at the second production location; and
(i) collecting an amount of the third produced gas, wherein the third produced gas quality of the collected third produced gas is higher than or equal to a threshold production quality for the third produced gas.

11. The method as claimed in claim 10 wherein the second produced gas quality is lower than the threshold injection quality for the second produced gas if the second produced gas includes more than a maximum allowable injection amount of carbon dioxide for the second produced gas.

12. The method as claimed in claim 10 wherein the third produced gas quality is lower than the threshold production quality for the third produced gas if the third produced gas includes more than a maximum allowable production amount of carbon dioxide for the third produced gas.

13. The method as claimed in claim 12 wherein the maximum allowable production amount of carbon dioxide included in the third produced gas is about 2 percent carbon dioxide by volume of the third produced gas.

14. The method as claimed in claim 12 wherein amounts of the first produced gas, the second produced gas and the third produced gas are combined to provide a combined produced gas having a combined produced gas quality and wherein the combined produced gas quality is lower than a threshold production quality for the combined produced gas if the combined produced gas includes more than a maximum allowable production amount of carbon dioxide for the combined produced gas.

15. The method as claimed in claim 14 wherein the maximum allowable production amount of carbon dioxide included in the combined produced gas is about 2 percent carbon dioxide by volume of the combined produced gas.

16. The method as claimed in claim 2 wherein the displacing gas is further comprised of a secondary displacing gas which has a relatively lower solubility in water than does carbon dioxide.

17. The method as claimed in claim 16 wherein the first produced gas quality is lower than the threshold production quality for the first produced gas if the first produced gas includes more than a maximum allowable production amount of the secondary displacing gas for the first produced gas or more than a maximum allowable production amount of carbon dioxide for the first produced gas.

18. The method as claimed in claim 17 wherein the first produced gas quality is lower than the threshold injection quality for the first produced gas if the first produced gas includes more than a maximum allowable injection amount of carbon dioxide for the first produced gas.

19. The method as claimed in claim 17 wherein the second produced gas quality is lower than the threshold production quality for the second produced gas if the second produced gas includes more than a maximum allowable production amount of the secondary displacing gas for the second produced gas or more than a maximum allowable production amount of carbon dioxide for the second produced gas.

20. The method as claimed in claim 19 wherein amounts of the first produced gas and the second produced gas are combined to provide a combined produced gas having a combined produced gas quality and wherein the combined produced gas quality is lower than a threshold production quality for the combined produced gas if the combined produced gas includes more than a maximum allowable production amount of the secondary displacing gas or more than a maximum allowable production amount of carbon dioxide for the combined produced gas.

21. The method as claimed in claim 19, further comprising:
(g) injecting an amount of the second produced gas into a third subterranean zone at a third injection location associated with the third subterranean zone, wherein the second produced gas quality of the injected second produced gas is higher than or equal to a threshold injection quality for the second produced gas;
(h) producing a third produced gas from the third subterranean zone at a third production location associated with the third subterranean zone, wherein the third production location is spaced from the third injection location, wherein the third produced gas has a third produced gas quality, and wherein the third produced gas quality changes over time following breakthrough of the third displacing gas at the second production location; and (i) collecting an amount of the third produced gas, wherein the third produced gas quality of the collected third produced gas is higher than or equal to a threshold production quality for the third produced gas.

22. The method as claimed in claim 21 wherein the second produced gas quality is lower than the threshold injection quality for the second produced gas if the second produced gas includes more than a maximum allowable injection amount of carbon dioxide for the second produced gas.

23. The method as claimed in claim 21 wherein the third produced gas quality is lower than the threshold production quality for the third produced gas if the third produced gas includes more than a maximum allowable production amount of the secondary displacing gas for the third produced gas or more than a maximum allowable production amount of carbon dioxide for the third produced gas.

24. The method as claimed in claim 23 wherein amounts of the first produced gas, the second produced gas and the third produced gas are combined to provide a combined produced gas having a combined produced gas quality and wherein the combined produced gas quality is lower than a threshold production quality for the combined produced gas if the combined produced gas includes more than a maximum allowable production amount of the secondary displacing gas or more than a maximum allowable production amount of carbon dioxide for the combined produced gas.

25. The method as claimed in claim 2 wherein the displacing gas is further comprised of a secondary displacing gas selected from the group of gases consisting of hydrocarbon gas, nitrogen and mixtures thereof.

26. The method as claimed in claim 2 wherein the displacing gas is further comprised of a secondary gas and wherein the secondary gas is nitrogen.

27. The method as claimed in claim 26 wherein the first produced gas quality is lower than the threshold production quality for the first produced gas if the first produced gas includes more than a maximum allowable production amount of nitrogen for the first produced gas.

28. The method as claimed in claim 27 wherein the maximum allowable production amount of nitrogen in the first produced gas is about 20 percent nitrogen by volume of the first produced gas.

29. The method as claimed in claim 27 wherein the displacing gas is flue gas.

30. The method as claimed in claim 27 wherein the first produced gas quality is lower than the threshold injection quality for the first produced gas if the first produced gas includes more than a maximum allowable injection amount of carbon dioxide for the first produced gas.

31. The method as claimed in claim 30 wherein the displacing gas is flue gas.

32. The method as claimed in claim 31, further comprising injecting an amount of flue gas into the second subterranean zone at the second injection location if the first produced gas quality is lower than the threshold injection quality for the first produced gas.

33. The method as claimed in claim 31, further comprising injecting an amount of air into the second subterranean zone at the second injection location if the first produced gas quality is lower than the threshold injection quality for the first produced gas.

34. The method as claimed in claim 27 wherein the second produced gas quality is lower than the threshold production quality for the second produced gas if the second produced gas includes more than a maximum allowable production amount of nitrogen for the second produced gas.

35. The method as claimed in claim 34 wherein the maximum allowable production amount of nitrogen in the second produced gas is about 20 percent nitrogen by volume of the second produced gas.

36. The method as claimed in claim 34 wherein the displacing gas is flue gas.

37. The method as claimed in claim 34 wherein amounts of the first produced gas and the second produced gas are combined to provide a combined produced gas having a combined produced gas quality and wherein the combined produced gas quality is lower than a threshold production quality for the combined produced gas if the combined produced gas includes more than a maximum allowable production amount of nitrogen for the combined produced gas.

38. The method as claimed in claim 37 wherein the maximum allowable production amount of nitrogen included in the combined produced gas is about 20 percent nitrogen by volume of the combined produced gas.

39. The method as claimed in claim 37 wherein the displacing gas is flue gas.

40. The method as claimed in claim 34, further comprising:

(g) injecting an amount of the second produced gas into a third subterranean zone at a third injection location associated with the third subterranean zone, wherein the second produced gas quality of the injected second produced gas is higher than or equal to a threshold injection quality for the second produced gas;

(h) producing a third produced gas from the third subterranean zone at a third production location associated with the third subterranean zone, wherein the third production location is spaced from the third injection location, wherein the third produced gas has a third produced gas quality, and wherein the third produced gas quality changes over time following breakthrough of the third displacing gas at the second production location; and (i) collecting an amount of the third produced gas, wherein the third produced gas quality of the collected third produced gas is higher than or equal to a threshold production quality for the third produced gas.

41. The method as claimed in claim 40 wherein the second produced gas quality is lower than the threshold injection quality for the second produced gas if the second produced gas includes more than a maximum allowable injection amount of carbon dioxide for the second produced gas.

42. The method as claimed in claim 41 wherein the displacing gas is flue gas.

43. The method as claimed in claim 42, further comprising injecting an amount of flue gas into the second subterranean zone at the second injection location if the first produced gas quality is lower than the threshold injection quality for the first produced gas.

44. The method as claimed in claim 42, further comprising injecting an amount of air into the second subterranean zone at the second injection location if the first produced gas quality is lower than the threshold injection quality for the first produced gas.

45. The method as claimed in claim 39 wherein the third produced gas quality is lower than the threshold production quality for the third produced gas if the third produced gas includes more than a maximum allowable production amount of nitrogen for the third produced gas.

46. The method as claimed in claim 45 wherein the maximum allowable production amount of nitrogen in the third produced gas is about 20 percent nitrogen by volume of the third produced gas.

47. The method as claimed in claim 45 wherein the displacing gas is flue gas.

48. The method as claimed in claim 45 wherein amounts of the first produced gas, the second produced gas and the third produced gas are combined to provide a combined produced gas having a combined produced gas quality and wherein the combined produced gas quality is lower than a threshold production quality for the combined produced gas if the combined produced gas includes more than a maximum allowable production amount of nitrogen for the combined produced gas.

49. The method as claimed in claim 48 wherein the maximum allowable production amount of nitrogen included in the combined produced gas is about 20 percent nitrogen by volume of the combined produced gas.

50. The method as claimed in claim 46 wherein the displacing gas is flue gas.

51. The method as claimed in claim 2 wherein the displacing gas is further comprised of a secondary gas and wherein the secondary gas is a hydrocarbon gas selected from the group of hydrocarbon gases consisting of methane, ethane, propane, butane and mixtures thereof.

52. The method as claimed in claim 51 wherein the first produced gas quality is lower than the threshold production quality for the first produced gas if the first produced gas includes more than a maximum allowable production amount of carbon dioxide for the first produced gas.

53. The method as claimed in claim 52 wherein the maximum allowable production amount of carbon dioxide in the first produced gas is about 2 percent carbon dioxide by volume of the first produced gas.

54. The method as claimed in claim 52 wherein the first produced gas quality is lower than the threshold injection quality for the first produced gas if the first produced gas includes more than a maximum allowable injection amount of carbon dioxide for the first produced gas.

55. The method as claimed in claim 54, further comprising injecting an amount of flue gas into the second subterranean zone at the second injection location if the first produced gas quality is lower than the threshold injection quality for the first produced gas.

56. The method as claimed in claim 54, further comprising injecting an amount of air into the second subterranean zone at the second injection location if the first produced gas quality is lower than the threshold injection quality for the first produced gas.

57. The method as claimed in claim 54 wherein the second produced gas quality is lower than the threshold production quality for the second produced gas if the second produced gas includes more than a maximum allowable production amount of carbon dioxide for the second produced gas.

58. The method as claimed in claim 57 wherein the maximum allowable production amount of carbon dioxide in the second produced gas is about 2 percent carbon dioxide by volume of the second produced gas.

59. The method as claimed in claim 57 wherein amounts of the first produced gas and the second produced gas are combined to provide a combined produced gas having a combined produced gas quality and wherein the combined produced gas quality is lower than a threshold production quality for the combined produced gas if the combined produced gas includes more than a maximum allowable production amount of carbon dioxide for the combined produced gas.

60. The method as claimed in claim 59 wherein the maximum allowable production amount of carbon dioxide included in the combined produced gas is about 2 percent carbon dioxide by volume of the combined produced gas.

61. The method as claimed in claim 57, further comprising:
(g) injecting an amount of the second produced gas into a third subterranean zone at a third injection location associated with the third subterranean zone, wherein the second produced gas quality of the injected second produced gas is higher than or equal to a threshold injection quality for the second produced gas;
(h) producing a third produced gas from the third subterranean zone at a third production location associated with the third subterranean zone, wherein the third production location is spaced from the third injection location, wherein the third produced gas has a third produced gas quality, and wherein the third produced gas quality changes over time following breakthrough of the third displacing gas at the second production location; and
(i) collecting an amount of the third produced gas, wherein the third produced gas quality of the collected third produced gas is higher than or equal to a threshold production quality for the third produced gas.

62. The method as claimed in claim 61 wherein the second produced gas quality is lower than the threshold injection quality for the second produced gas if the second produced gas includes more than a maximum allowable injection amount of carbon dioxide for the second produced gas.

63. The method as claimed in claim 62, further comprising injecting an amount of flue gas into the second subterranean zone at the second injection location if the first produced gas quality is lower than the threshold injection quality for the first produced gas.

64. The method as claimed in claim 62, further comprising injecting an amount of air into the second subterranean zone at the second injection location if the first produced gas quality is lower than the threshold injection quality for the first produced gas.

65. The method as claimed in claim 61 wherein the third produced gas quality is lower than the threshold production quality for the third produced gas if the third produced gas includes more than a maximum allowable production amount of carbon dioxide for the third produced gas.

66. The method as claimed in claim 65 wherein the maximum allowable production amount of carbon dioxide in the third produced gas is about 2 percent carbon dioxide by volume of the third produced gas.

67. The method as claimed in claim 65 wherein amounts of the first produced gas, the second produced gas and the third produced gas are combined to provide a combined produced gas having a combined produced gas quality and wherein the combined produced gas quality is lower than a threshold production quality for the combined produced gas if the combined produced gas includes more than a maximum allowable production amount of carbon dioxide for the combined produced gas.

68. The method as claimed in claim 67 wherein the maximum allowable production amount of carbon dioxide included in the combined produced gas is about 2 percent carbon dioxide by volume of the combined produced gas.

* * * * *